(12) United States Patent
Conness et al.

(10) Patent No.: US 11,158,105 B2
(45) Date of Patent: *Oct. 26, 2021

(54) METHODS AND SYSTEMS FOR GENERATING HOLOGRAPHIC ANIMATIONS

(71) Applicant: Rovi Guides, Inc., San Jose, CA (US)

(72) Inventors: Jason W. Conness, Pasadena, CA (US); Todd Mariani, Philadelphia, PA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/785,844

(22) Filed: Feb. 10, 2020

(65) Prior Publication Data

US 2020/0302673 A1    Sep. 24, 2020

Related U.S. Application Data

(63) Continuation of application No. 15/940,478, filed on Mar. 29, 2018, now Pat. No. 10,600,227, which is a continuation of application No. 14/631,968, filed on Feb. 26, 2015, now Pat. No. 9,959,658.

(51) Int. Cl.

| G06F 3/00 | (2006.01) |
| G06T 13/80 | (2011.01) |
| G06F 3/01 | (2006.01) |
| G06F 3/0484 | (2013.01) |
| G06F 3/0482 | (2013.01) |
| G06F 16/54 | (2019.01) |
| G06F 16/58 | (2019.01) |

(52) U.S. Cl.
CPC .............. *G06T 13/80* (2013.01); *G06F 3/011* (2013.01); *G06F 3/012* (2013.01); *G06F 3/013* (2013.01); *G06F 3/017* (2013.01); *G06F 3/0482* (2013.01); *G06F 3/04842* (2013.01); *G06F 3/04845* (2013.01); *G06F 16/54* (2019.01); *G06F 16/5866* (2019.01)

(58) Field of Classification Search
CPC combination set(s) only.
See application file for complete search history.

(56) References Cited

U.S. PATENT DOCUMENTS

| 10,740,947 B2* | 8/2020 | Stukalov | G06T 11/60 |
| 2008/0295012 A1* | 11/2008 | Sloo | G06F 3/0486 |
| | | | 715/769 |
| 2011/0169927 A1* | 7/2011 | Mages | G06F 3/04815 |
| | | | 348/51 |
| 2012/0272149 A1* | 10/2012 | Lee | H04N 21/4316 |
| | | | 715/716 |
| 2013/0007647 A1* | 1/2013 | Kamiyama | G06F 3/0486 |
| | | | 715/769 |

* cited by examiner

*Primary Examiner* — Hien L Duong
(74) *Attorney, Agent, or Firm* — Haley Guiliano LLP

(57) ABSTRACT

Methods and systems are described herein for improved techniques for consuming and interacting with media content. Specifically, the media guidance application may generate holographic animations that move from a holographic structure from which a user has selected a media asset and direct the user to a display device capable of presenting the media asset. For example, in response to a user selecting a baseball movie from a holographic bookcase, the media guidance application may generate for display a holographic baseball that is "thrown" from the bookcase to a television that will present the baseball movie.

20 Claims, 7 Drawing Sheets

METHODS AND SYSTEMS FOR GENERATING HOLOGRAPHIC ANIMATIONS

CROSS-REFERENCE TO RELATED APPLICATION

This application is a continuation of U.S. patent application Ser. No. 15/940,478, filed Mar. 29, 2018, which is a continuation of U.S. patent application Ser. No. 14/631,968 filed Feb. 26, 2015, now U.S. Pat. No. 9,959,658. The disclosures of which are hereby incorporated by reference herein their entireties.

BACKGROUND

Media content is increasingly available on a plurality of user devices (e.g., televisions, smartphones, computers, etc.). However, while many of these devices allow users to input commands using various methods (e.g., physical buttons, touchscreens, voice recognition, etc.), the devices are nonetheless limited to presenting content via a traditional display screen. While some traditional devices and input schemes may be suitable for many types of content, users are increasingly interested in other ways of consuming and interacting with media content.

SUMMARY

Accordingly, methods and systems are described herein for improved techniques for consuming and interacting with media content. Specifically, a media guidance application may present holographic representations (e.g., through the use of wearable electronics such as an optical user device) of media listings for media assets that are consumed in traditional formats. For example, the media guidance application may generate for display holographic structures (e.g., bookcases, movie posters, store shelves, etc.) that feature a plurality of non-holographic media assets. Moreover, the media guidance application may generate holographic animations that move from the holographic structure and direct the user to a display device capable of presenting the media asset. For example, in response to a user selecting a baseball movie from a holographic bookcase, the media guidance application may generate for display a holographic baseball that is "thrown" from the bookcase to a television that will present the baseball movie.

To determine the path along which the baseball will be "thrown," the media guidance application may determine the coordinates of holographic structure in relation to the coordinates of a display device that will present the selected media asset. Based on the coordinates, and/or the trajectory of a user interaction that selected the media asset, the media guidance application may generate a holographic animation that travels between the holographic structure and the display device. Furthermore, the holographic animation may travel in a non-linear path. For example, the path of the holographic animation may arc or curve based on the type of animation, user interaction, etc. For example, a holographic animation featuring leaves may follow a non-linear path as the leaves are "blown" from the holographic structure to the display device.

In some aspects, a media guidance application may generate for display holographic media content at a first location. For example, the media guidance application may determine a user's line of sight and generate for display a holographic structure (e.g., a bookcase, file cabinet, etc.) along that line of sight. In some embodiments, the first location may be keyed to a particular physical structure (e.g., a wall of a room in which the user is currently situated). Furthermore, the holographic structure may be sized and shaped to appear to be physically touching the physical structure (e.g., hanging on the wall).

The media guidance application may detect a user interaction at the first location selecting a portion of the holographic media content. For example, the media guidance application may monitor for a hand of a user entering coordinates associated with the holographic structure and/or may monitor for a portion of the holographic structure on which the user is currently focusing. For example, if the media guidance application is presenting a holographic structure in the form of a bookcase, in which each holographic book in the holographic bookcase corresponds to a particular media listing, the media guidance application may determine which holographic book the user selected.

The media guidance application may determine a media asset associated with that portion. For example, in order to allow a user to more easily navigate content, the media guidance application may present listings for available media assets within a holographic structure that provides an intuitive holographic interface. For example, the holographic structure may appear as a bookshelf featuring books arranged alphabetically, in which each book corresponds to an available media asset. In another example, the holographic structure may appear as a file cabinet featuring files arranged alphabetically, in which each file corresponds to an available media asset.

The media guidance application may cross-reference the media asset with a database listing holographic animations associated with various media assets to determine a holographic animation associated with the media asset. For example, each media asset may correspond to a unique animation, in which the unique animation is based on the content of the media asset. For example, a crime drama may feature an animation with moving police cars, a horror movie may feature an animation with a stalking monster, etc. To determine a holographic animation associated with the media asset, the media guidance application may reference a look-up table database listing the animation that corresponds to each media asset.

The media guidance application may then determine a trajectory for the holographic animation from the first location to a second location, in which the second location includes a display device for presenting the media asset to a user. For example, after selecting a holographic animation, the media guidance application may determine a path along which the animation should travel. The path may correspond to a path between a holographic structure the user is interacting with and a display device upon which the user will consume the media asset.

The media guidance application may then generate for display the holographic animation along the trajectory. For example, in response to selecting "Star Wars" from a holographic bookcase, a holographic animation of the Millennium Falcon may appear to fly towards the display device. In another example, in response to selecting "The Wizard of Oz" from the holographic bookcase, a holographic animation of tornado may appear to blow towards the display device.

In some embodiments, the media guidance application may select the second location from a plurality of locations based on a format of the display device corresponding to a format of the media asset. For example, in response to selecting a video file, a holographic animation associated with the video file may appear to move towards a television. In another example, in response to selecting an audio file, a holographic animation associated with the audio file may appear to move towards a stereo. In yet another example, in response to selecting a high definition media asset, a holographic animation associated with the media asset may appear to move towards all display devices capable of presenting the media asset.

In some embodiments, to determine the trajectory for the holographic animation from the first location to a second location, the media guidance application may determine a direction and distance from the first location to the second location. For example, the media guidance application may ensure that the holographic animation appears to move in a direction towards a display device and appears to move the complete distance to the display device. In some embodiments, the trajectory may also be affected by the user interaction. For example, the media guidance application may determine a speed or direction associated with the user and modify the speed or trajectory of the holographic animation accordingly. For example, a more forceful swipe of a portion of the holographic content may result in a faster holographic animation than a less forceful swipe.

In some embodiments, the media guidance application may also determine a display device from a plurality of available display devices based on the user interaction. For example, a more forceful swipe of a portion of the holographic content may result in the media guidance application selecting a display device that is farther away than a display device that would be selected if the swipe was less forceful. In another example, a swipe of a portion of the holographic content in a first direction may result in the media guidance application selecting a different display device than if the swipe was in a second direction.

It should be noted, the systems and/or methods described above may be combined with, applied to, or used in accordance with, other systems, methods and/or apparatuses discussed both above and below.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
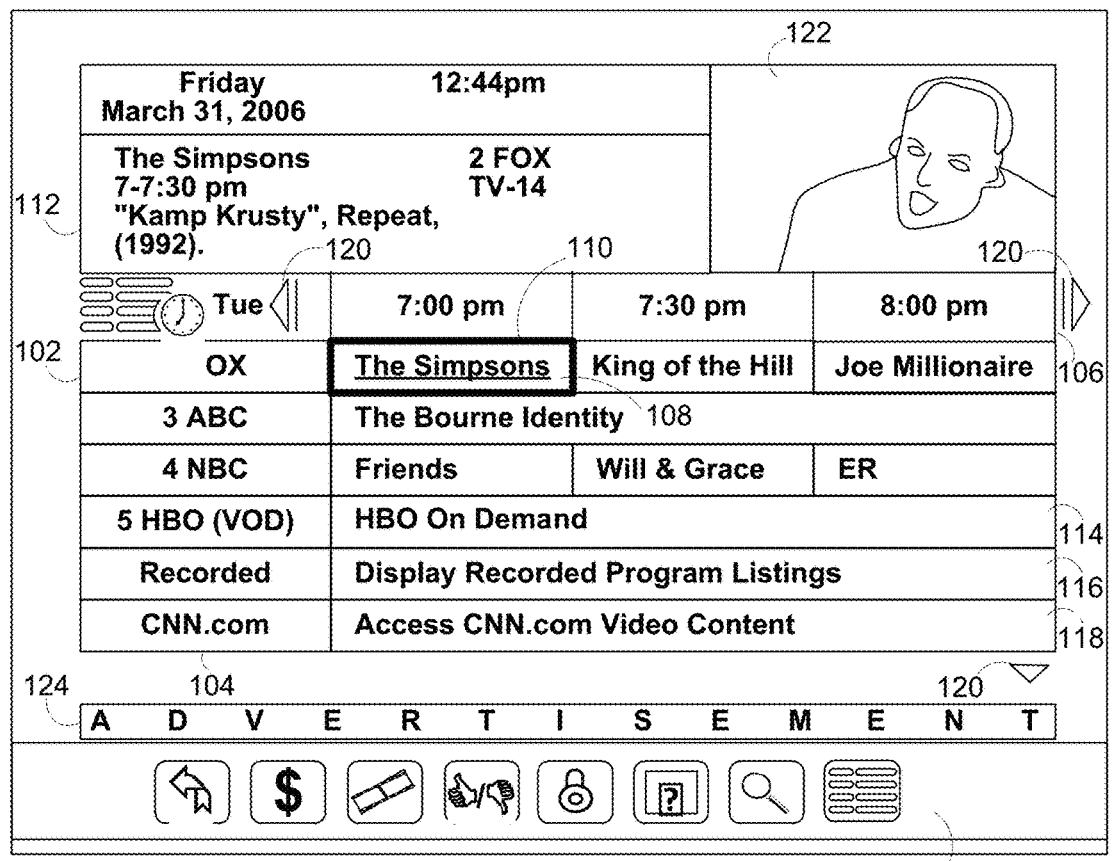
FIG. 1 shows an illustrative example of a media guidance display that may be presented in accordance with some embodiments of the disclosure.

Methods and systems are described herein for improved techniques for consuming and interacting with media content. Specifically, a media guidance application may present holographic representations (e.g., through the user of wearable electronics such as an optical user device) of media listings for media assets that are consumed in traditional formats. For example, the media guidance application may generate for display holographic structures (e.g., bookcases, movie posters, store shelves, etc.) that feature a plurality of non-holographic media assets. Moreover, the media guidance application may generate holographic animations that move from the holographic structure and direct the user to a display device capable of presenting the media asset.

As used herein, "a media guidance application," refers to an application that provides a form of media guidance through an interface that allows users to view, navigate, and/or modify media content. Interactive media guidance applications may take various forms depending on the content. One typical type of media guidance application is an interactive television program guide. In some embodiments, the media guidance application may be provided as an on-line application (i.e., provided on a website), or as a stand-alone application on a server, user device, etc. Various devices and platforms that may implement the media guidance application are described in more detail below. In some embodiments, the media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media card, register memory, processor caches, Random Access Memory ("RAM"), etc.

Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

In some embodiments, the media guidance application may also present media guidance data. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

In some embodiments, media content may be presented in a holographic and/or virtual form. In general, holography is a technique which enables three-dimensional images to be made. It involves the use of a laser, interference, diffraction, light intensity recording and suitable illumination of the recording. The image changes as the position and orientation of the viewing system changes in exactly the same way as if the object were still present, thus making the image appear three-dimensional.

For example, a media guidance application may generate for display (e.g., via a holographic interface) holographic media content such as a media guide structured as a three-dimensional object (e.g., a cube) that may feature one or more portions that may be rotated, opened, closed, rearranged, and/or otherwise modified in order to access additional holographic media content (e.g., a holographic movie, advertisement, etc.). In addition, generating holographic content at a holographic interface, the media guidance application may send or receive holographic content presented on a first holographic interface to or from a second holographic interface.

Holographs may be generated for display through the use of holographic interfaces using numerous techniques. In one example, a hologram is composed of light interference patterns recorded on a medium (e.g., a holographic film). To generate the light interference patterns on the film, a light source is split into multiple beams and scattered off an object and a recording medium. As a result of the scattering, the light beam becomes out of phase, which gives rise to holographic "fringes" recorded in the medium. When light is subsequently applied to the medium at a holographic interface, the fringes provide three-dimensional depth. As used herein, a "holographic interface," is any device capable of generating for display holographic media content. For example, in some embodiments, a holographic interface may include user devices (e.g., a cable box, a wearable electronic device such as a pair of smart glasses or a smart watch, a television, a smartphone, a computer, a tablet, an art piece, a household electronic device, etc.) that may incorporate an appropriate medium for generating a display of holographic media content.

By using a recording medium that is dynamically updatable (e.g., may reproduce multiple recorded light fields in series), a media guidance application may generate a holographic media asset at a holographic interface. Photorefractive polymers, which may be used as dynamically updatable recording mediums are described in greater detail in Blanche et al., "Holographic three-dimensional telepresence using large-area photorefractive polymer," Nature, 468, 80-83 (Nov. 4, 2010), which is hereby incorporated by reference herein in its entirety.

The creation and manipulation of holograms is also discussed in greater detail in Marlow et al., U.S. Patent Pub. No. 2012/0090005, published Apr. 12, 2012; Lawrence et al., U.S. Patent Pub. No. 2011/0251905, published Oct. 13, 2011; Salter et al., U.S. Patent Pub. No. 2013/0321462, published Dec. 5, 2013; and Jensen et al. U.S. patent application Ser. No. 13/961,145, filed Aug. 7, 2013; which are hereby incorporated by reference herein in their entireties.

In some embodiments, content may be presented as virtual. Virtual content refers to content that does not physically exist, or does not have a physical relationship to an object that physically exists, but is made to appear to be physically existing, or made to appear to have a physical relationship to an object that physically exists, by the media guidance application. For example, the media guidance application may present content that appears to be a physically existing object (e.g., a bookcase, a file cabinet, a shelf, a cabinet, art work, etc.) overlaid on an actual physically existing object (e.g., a real world wall, table, floor, ceiling, billboard, etc.) or floating freely before a user. Furthermore, the media guidance application may present content that appears to a user to be fixed to the physically existing object. For example, the media guidance application may present a virtual display screen such that the display screen appears to be incorporated into a physically existing wall.

In some embodiments, content is given the appearance of physically existing (i.e., being virtual) through the use of user optical devices. As referred to herein, a "user optical device" is an optical head-mounted display through which a user may perceive both physically existing content and content generated by the media guidance application. For example, a user optical device may be fashioned as traditional headwear (e.g., glasses, visors, goggles, masks, etc.) that includes heads-up display features. Each user optical device features a heads-up display (i.e., a transparent display that presents data without requiring users to look away from their usual viewpoints) that allows a user to perceive both physically existing objects (e.g., real world objects) and virtual objects (e.g., objects generated by the media guidance application that appear to be physically existing). Typically, the heads-up display is incorporated into the lens (or a corresponding feature) of the user optical device such that a user may perceive virtual content anywhere within the field of vision of the user (and virtual content may be overlaid on any object within the field of vision of the user).

Additional disclosure of embodiments related to the presentation of virtual content using optical user devices is described in Klappert et al., U.S. patent application Ser. No. 14/143,899, filed Dec. 30, 2013, which is hereby incorporated by reference in its entirety. It should be noted that throughout this disclosure embodiments related to holographic media content may also be applied to virtual content and/or any other type of media content.

In some embodiments, holographic interfaces and user optical devices may be referred to as user equipment devices. As referred to herein, the phrase "user equipment device," "user equipment," "user device," "electronic device," "electronic equipment," "media equipment device," or "media device" should be understood to mean any device, including user optical devices, for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same.

In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

In some embodiments, the media guidance application may also present content through the use of a camera and/or projector. For example, a holographic projector may cause holographic media content to appear at a particular location. The media guidance application may then determine whether or not the content is modified (as discussed below) in response to detecting user interactions at that location.

In some embodiments, the media guidance application may monitor the user and/or area about the holographic interface for user interactions that may cause the media guidance application to execute a media guidance function. As used herein, a "media guidance function" refers to any feature, operation, or service related to the consumption of a media asset and/or media guidance data by one or more users.

For example, a media guidance function may refer to the presentation, selection, modification, and/or manipulation of media content, including but not limited to holographic media content. For example, while presenting holographic media content, the media guidance application may detect touch and grab gestures and modify the holographic media content such that a user can virtually interact with the content. For example, the holographic media content (e.g., movie listings, television show recommendations, etc.) may appear as items organized in a dresser of multiple drawers. The media guidance application may modify the holographic media content such that a user can open and close the drawers to reveal accessible content (e.g., additional content related to a movie listing). In another example, the media guidance application may present portions of a holographic guide as a bookcase and/or shelf with holographic media content identified by text on the side (e.g., the spine of a book) of each holographic book. In yet another example, the media guidance application may present the holographic content in a cube formation in which the planes in a grid are the top levels of a media guidance screen (e.g., as discussed below in relation to FIG. 1).

In some embodiments, the media guidance application may add/remove one or more portions of holographic media content (e.g., a scene with objectionable content) based on a parental control setting that indicates the portion violates a rating, filter setting, etc. In another example, the media guidance application may add holographic subtitles, additional content, recommendations, advertisements, etc., that appear overlaid on holographic media content and/or any other content.

In some embodiments, the media guidance application may allow users to pull out the holographic media content and float multiple items in front of themselves individually or layer them on top of one another with space in between to see the titles/images of the multiple items. The media guidance application may also cause the items to maintain a set position or to fan out, rotate, and/or expand (e.g., in a stair step fashion). The holographic media content may also be displayed in various shapes and/or organizational schemes. For example, the media guidance application may generate for display holographic media content that includes a grid (e.g., resembling a periodic chart) that lists media content (e.g., television programs) or other products (e.g., available for sale), viewing recommendations based on one or more virtual or physically existing objects (e.g., based on an automatic detection of the objects and/or a user selection of the objects), etc.

The media guidance application may also respond to other user interactions such as gestures that draw a shape over all desired drawers to highlight (e.g., with a glowing, moving, and/or dashed line), flipping and/or flicking the tops of holographic media content listings back and forth (e.g., similar to the actions done in a filing cabinet), tap particular positions on the holographic media content to access particular content, and/or any other appropriate gestures.

In another example, a media guidance function may include the display and/or selection of an advertisement and/or purchase of a product. For example, using a holographic interface, a media guidance application may generate interactive content and/or T-Commerce applications that allow users to extract predetermined content from within a media asset (whether or not the media asset itself is holographic). The media guidance application may then generate for display holographic media content that a user may investigate further. The media guidance application may further allow a user to virtually "touch and feel" the holographic media content by modifying the size, orientation, etc., of the holographic media content in response to detected user interactions. For example, the media guidance application may allow users to virtually open and close doors on products, virtually try on clothes (e.g., overlay clothing, shoes, glasses, etc.) on a hologram of a user (e.g., retrieved from a user profile) or on the actual user, and/or access other content or features (e.g., holographic shopping carts, wish lists, birthday lists, etc.) associated with a product or an advertiser.

In another example, a media guidance function may refer to a performance of a fast-access playback operation on a holographic media asset. As referred to herein, the phrase "fast-access playback operations" should be understood to mean any operation that pertains to playing back a non-linear media asset at faster than normal playback speed or in a different order than the media asset is designed to be played, such as a fast-forward, rewind, skip, chapter selection, segment selection, skip segment, jump segment, next segment, previous segment, skip advertisement or commercial, next chapter, previous chapter or any other operation that does not play back the media asset at normal playback speed. The fast-access playback operation may be any playback operation that is not "play," where the play operation plays back the media asset at normal playback speed.

In another example, a media guidance function may refer to the sharing of holographic media content. For example, in some embodiments, a media guidance application may generate for display holographic media content at a first holographic interface and detect a first user interaction at the first holographic interface associated with a portion of the holographic media content. The media guidance application may then determine a trajectory associated with the first user interaction and identify a second holographic interface associated with the trajectory. In response to identifying the second holographic interface associated with the trajectory, the media guidance application may instruct the second holographic interface to generate for display the portion of the holographic media content.

For example, the media guidance application may detect a user interaction (e.g., a hand motion associated with pushing or throwing an object) within a particular proximity of a portion of holographic media content. Based on this user interaction, the media guidance application may perform a media guidance function associated with the user interaction (e.g., presenting a media asset).

As used herein, a "trajectory" of a user interaction refers to a path that an object follows through space. For example, a holographic animation may appear to travel according to a particular trajectory. Furthermore, this trajectory may be defined by one or more components. For example, a trajectory associated with a user interaction may be defined by the velocity, direction, etc., of the hand of a user when the user "touches" a portion of holographic media content. As used herein, a "component" of the trajectory refers to any characteristic that may affect the trajectory. For example, components may include the speed or velocity, the direction or angle, and/or any other measurement that may affect the trajectory.

In some embodiments, the components of a trajectory are determined at the instant a user "touches" holographic media content (i.e., when the coordinates associated with a portion of holographic media content overlap coordinates associated with a hand of a user). In some embodiments, the components of a trajectory may also be based on the characteristics of a user interaction before or after "touching" the portion of the holographic media content. For example, acceleration of the hand of the user prior to "touching" the portion of the holographic media content may also affect the determined trajectory.

In some embodiments, the media guidance application may modify the presented content in response to user interactions. For example, if the media guidance application presents holographic media content that is associated with a particular real world object (e.g., a wall, table, etc.), the media guidance application may monitor the actions of a user relative to the real world object. If the user contacts the real world object and/or performs other actions within the vicinity of the real world object, the media guidance application may determine whether or not the contact and/or actions cause a corresponding change to the holographic media content. If so, the media guidance application may perform a media guidance function based on the contact and/or action.

For example, the media guidance application may determine that a user is making contact with (e.g., touches, swipes, pinches, etc.) the wall and/or a particular area associated with a holographic interface. Based on this user interaction (e.g., associated with changing a channel in a holographic media guide), the media guidance application may modify the holographic media content in ways corresponding to the contact the user made with the wall (e.g., by changing the channel in the holographic media guide). In another example, the media guidance application may present a media playlist. The media playlist may be modified (e.g., media assets may be added and/or removed) based on user interactions. For example, the media guidance application may receive a user interaction (e.g., a "pinch" hand motion followed by a "toss" hand motion) that indicates that a first user (e.g., associated with a first holographic interface) wishes to share a song in the holographic media playlist with a second user (e.g., associated with a second holographic interface). In response, the media guidance application may instruct the second holographic interface to present a listing of the song in a holographic media playlist at the second holographic interface.

In some embodiments, the media guidance application may determine a plurality of acceptable user interactions associated with the selection of a portion of holographic media content. For example, the media guidance application may recognize only a particular set of user interactions (e.g., in order to reduce false positives).

In some embodiments, the media guidance application may select another holographic interface based on other criteria. For example, the media guidance application may receive a user input identifying a user authorized to view a portion of the holographic media content. If the media guidance application determines the second holographic interface is associated with the user authorized to view the portion of the holographic media content, the media guidance application then selects a second holographic interface.

In some embodiments, identifying a location and a display device at that location may be synonymous. For example, a media guidance application may retrieve a listing (e.g., from a device profile associated with a location) of one or more devices associated with the location. Furthermore, in some embodiments, when a user interacts with a holographic structure, the media guidance application may transmit identification information to display devices that may present various types of media content as well as the location of the display devices. The media guidance application may use any received/retrieved information about a display device and/or a location to select a particular display device and/or location.

Figure 2:
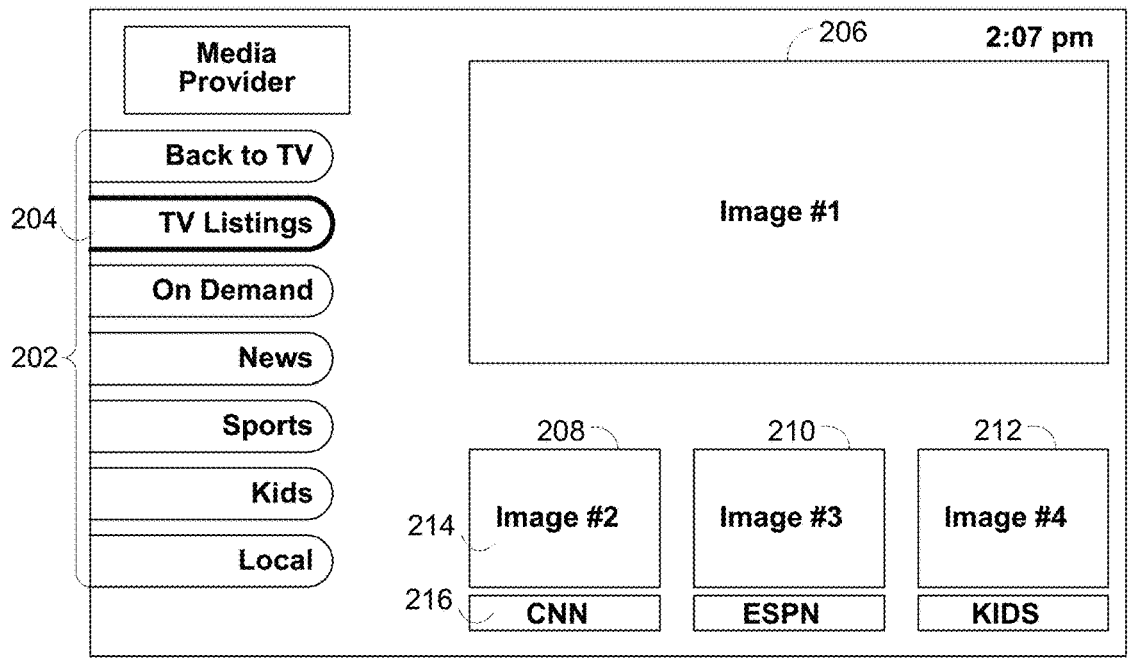
FIG. 2 shows another illustrative example of a media guidance display that may be presented in accordance with some embodiments of the disclosure.

FIGS. 1-2 show illustrative display screens that may be used to provide holographic media content. In some embodiments, a user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria on one or more user optical devices. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. In some embodiments, display 100 may appear to a user as holographic media content. For example, a media guidance application may generate a presentation of display 100 as a three dimensional shape (e.g., a cube), in which display 100 appears on one of more faces of the shape.

Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to, or be unrelated to, one or more of the content listings in grid 102. Advertisement 124 may also be for products or services related, or unrelated, to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, selectable option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
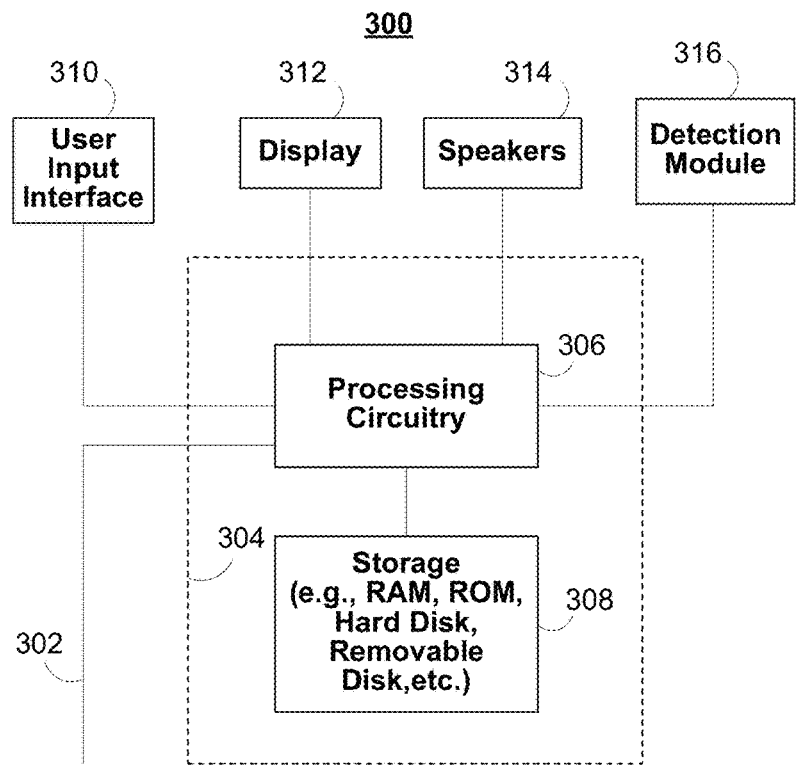
FIG. 3 is a block diagram of an illustrative user equipment device in accordance with some embodiments of the disclosure.

Users may access holographic media content and the media guidance application (and its display screens described above and below) from one or more of their user equipment devices. For example, a user may access holographic media content and the media guidance application from one or more holographic interfaces. FIG. 3 shows a generalized embodiment of illustrative user equipment device 300, which may in some embodiments constitute a holographic interface, a device capable of presenting a holographic structure to a user, and/or a device capable of implementing a media guidance application. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Control circuitry 304 may also perform multiple computations in order to determine a trajectory as described herein and/or to determine one or more locations. For example, using standard mathematical calculations the media guidance application may determine the direction and distance between two locations.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Storage 308 may be used to store various types of content described herein as well as media guidance data and guidance application data that are described above. Non-volatile memory may also be used (e.g., to launch a boot-up routine and other instructions). Cloud-based storage, described in relation to FIG. 4, may be used to supplement storage 308 or instead of storage 308.

In some embodiments, storage 308 may include coordinates of one or more locations and/or display devices. For example, the media guidance application may access storage 308 when determining where a display device for presenting a selected media asset is located. In another example, storage 308 may indicate what display devices are available at a particular location (e.g., when the media guidance application is selecting among a plurality of display devices.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces.

In some embodiments, user input interface may be incorporated into user equipment device 300 or may be incorporated into another device accessible by user equipment device 300. For example, if user equipment device 300 is a user optical device, surface space limitation may prevent user input interface from recognizing one or more input types. In such case, user input interface 310 may be implemented on a separate device that is accessible to control circuitry 304 (FIG. 3)).

Display 312 may be provided as heads-up display for user equipment device 300. In some embodiments, if user equipment device 300 is a user optical device configured as headwear, display 312 may constitute a lens or similar feature of the headwear. In some embodiments, display 312 may be one or more of a monitor, a television, a liquid crystal display (LCD) for a mobile device, or any other suitable equipment for displaying visual images generated by the media guidance application while also allowing a user to see physically existing objects within his/her field of vision. In some embodiments, display 312 may be HDTV-capable. In some embodiments, display 312 may include holographic and/or 3D display properties, and the interactive media guidance application and any suitable content may be displayed in holograms and/or 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304.

Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images.

User equipment device 300 may also incorporate or be accessible to detection module 316. Detection module 316 may further include various components (e.g., a video detection component, an audio detection component, object recognition component, etc.). In some embodiments, detection module 316 may include components that are specialized to generate particular information (e.g., determining whether or not a user is interacting with holographic media content, etc.).

In some embodiments, detection module 316 may include a content recognition component. The content recognition component may use object recognition techniques such as edge detection, pattern recognition, including, but not limited to, self-learning systems (e.g., neural networks), optical character recognition, on-line character recognition (including but not limited to dynamic character recognition, real-time character recognition, intelligent character recognition), and/or any other suitable technique or method to identify objects (e.g., hands associated with a user) within a proximity of holographic media content and/or a holographic interface.

In some embodiments, detection module 316 may also incorporate or have access to a global positioning module. Using the global positioning module, detection module 316 may define the coordinates of holographic media content and/or a display device. Based on this information, the media guidance application may determine the coordinates that correspond to the holographic media content and a user. For example, if the coordinates associated with a holographic media content and a user overlap, the media guidance application may determine that the user is performing a user interaction with the holographic media content. In another example, the media guidance application may receive GPS coordinates associated with where a holographic structure appears to a user (e.g., a first location) and where a display device is location (e.g., a second location). The media guidance application may use the different sets of coordinates to determine trajectory of a holographic animation.

The media application may receive data in the form of a video from detection module 316. The video may correspond to the direction that a user optical device is currently pointed. Furthermore, the video may cover the entire field of vision of the user. The video may include a series of frames. For each frame of the video, the media application may use a content recognition module or algorithm to determine the objects (e.g., hands of a user) in the frame. Detection module 316 may also determine the bounds of each detected object and describe those bounds in terms of global positioning coordinates retrieved from the global positioning module. The detected objects and the coordinates for those objects may then be sent to control circuitry 304 to determine whether or not those bounds correspond to the bounds of holographic media content generated for display by a holographic interface.

The media guidance application may then match the coordinates defining the bounds of the holographic media content that is presented to the coordinates of the bounds of the object. Furthermore, the media guidance application may determine a position of the user and adjust the holographic media content based on the position of the user (e.g., ensuring that the holographic media content reacts appropriately to user interactions). For example, detection module 316 may determine a user is performing a twisting motion with his hands within the proximity of the holographic media content. Accordingly, the media guidance application may cause the holographic media content to rotate in the direction of the twisting motion.

In some embodiments, detection module 316 may include an eye contact detection component, which determines or receives a location upon which one or both of a user's eyes are focused (e.g., as discussed below in relation to FIG. 7). The location upon which a user's eyes are focused is referred to herein as the user's "gaze point." In some embodiments, the eye contact detection component may monitor one or both eyes of a user of user equipment 300 to identify a gaze point at a position on display 312 for the user. The eye contact detection component may additionally or alternatively determine whether one or both eyes of the user are focused on a position associated holographic media content (e.g., indicating that a user is focusing on a particular portion of the holographic media content) or focused on a location that is not associated with the holographic media content. In some embodiments, the eye contact detection component includes one or more sensors that transmit data to processing circuitry 306, which determines a user's gaze point. The eye contact detection component may be integrated with other elements of user equipment device 300, or the eye contact detection component, or any other component of detection module 316, and may be a separate device or system in communication with user equipment device 300.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
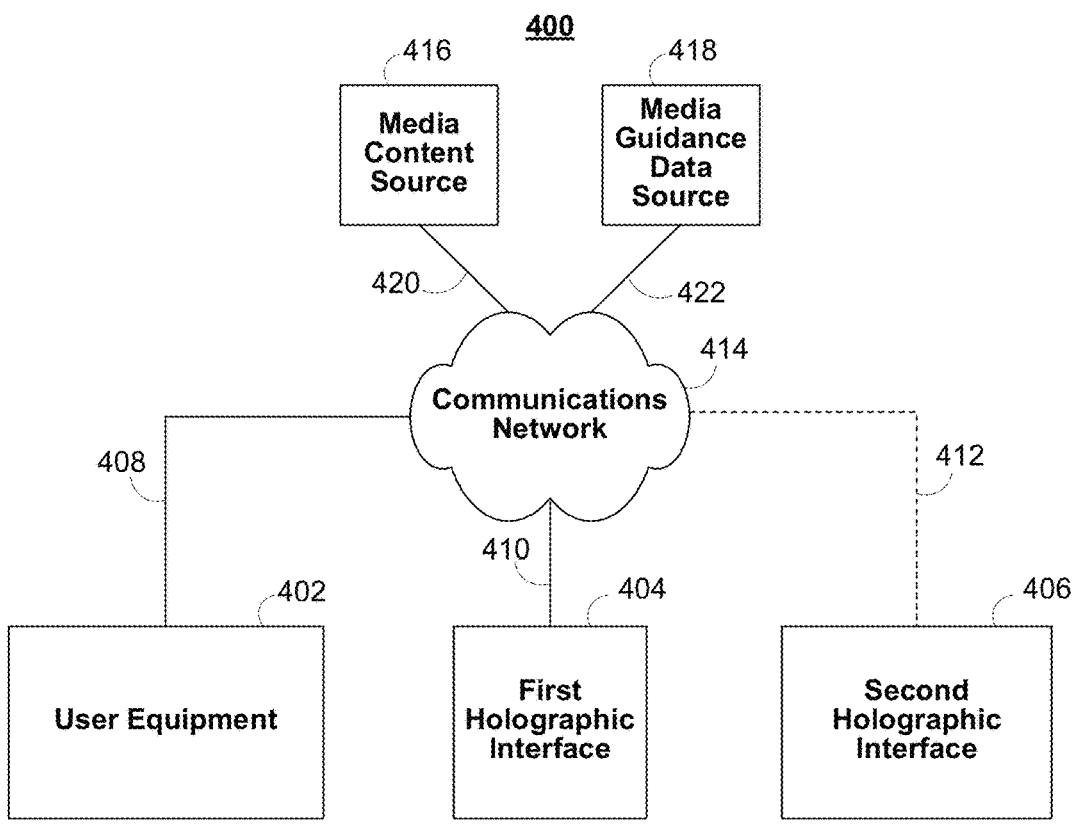
FIG. 4 is a block diagram of an illustrative media system in accordance with some embodiments of the disclosure.

User equipment device 300 of FIG. 3 can be implemented in system 400 of FIG. 4 as user equipment 402, first holographic interface 404, second holographic interface 406, or any other type of user equipment suitable for presenting/accessing holographic media content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a stand-alone device or may be part of a network of devices. Various network configurations of devices may be implemented and are discussed in more detail below.

In some embodiments, user equipment 402 device and first holographic interface 404 or second holographic interface 406 utilizing at least some of the system features described above in connection with FIG. 3 may not be classified solely as user equipment or user optical devices. For example, in some embodiments, user equipment or holographic interfaces may act like television equipment (e.g., include a tuner allowing for access to television programming) and user computer equipment (e.g., be Internet-enabled allowing for access to Internet content). The media guidance application may have the same layout on various different types of user equipment or may be tailored to the display capabilities of the user equipment. For example, on user computer equipment, the guidance application may be provided as a web site accessed by a web browser. In another example, the guidance application may be scaled down for wireless user communications devices (e.g., smartphones). If a user device is not capable of presenting holographic media content, the media guidance application may present substitute content instead. Additionally or alternatively, if a user device is capable of presenting holographic media content, the media guidance application may present holographic media content as a default.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user equipment 402, first holographic interface 404, second holographic interface 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user equipment 402, first holographic interface 404, and second holographic interface 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired).

Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412.

Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment 402, first holographic interface 404, and second holographic interface 406 are shown as through communications network 414, in some embodiments, sources 416 and 418 may communicate directly with user equipment 402, first holographic interface 404, and second holographic interface 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment 402, first holographic interface 404, and second holographic interface 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment 402, first holographic interface 404, and second holographic interface 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user equipment 402, first holographic interface 404, and second holographic interface 406 may access the media guidance application to navigate among and locate desirable content. Users may also access the media guidance application outside of the home using first holographic interface 404, and they may also use second holographic interface 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user equipment 402, first holographic interface 404, and second holographic interface 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

A user may use various content capture devices, such as camcorders, digital cameras with video mode, audio recorders, mobile phones, and handheld computing devices, to record content. The user can upload content to a content storage service in the cloud either directly, for example, from user equipment 402, first holographic interface 404, or second holographic interface 406, or, alternatively, the user can first transfer the content to a user equipment device, such as user equipment 402, first holographic interface 404, or second holographic interface 406. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
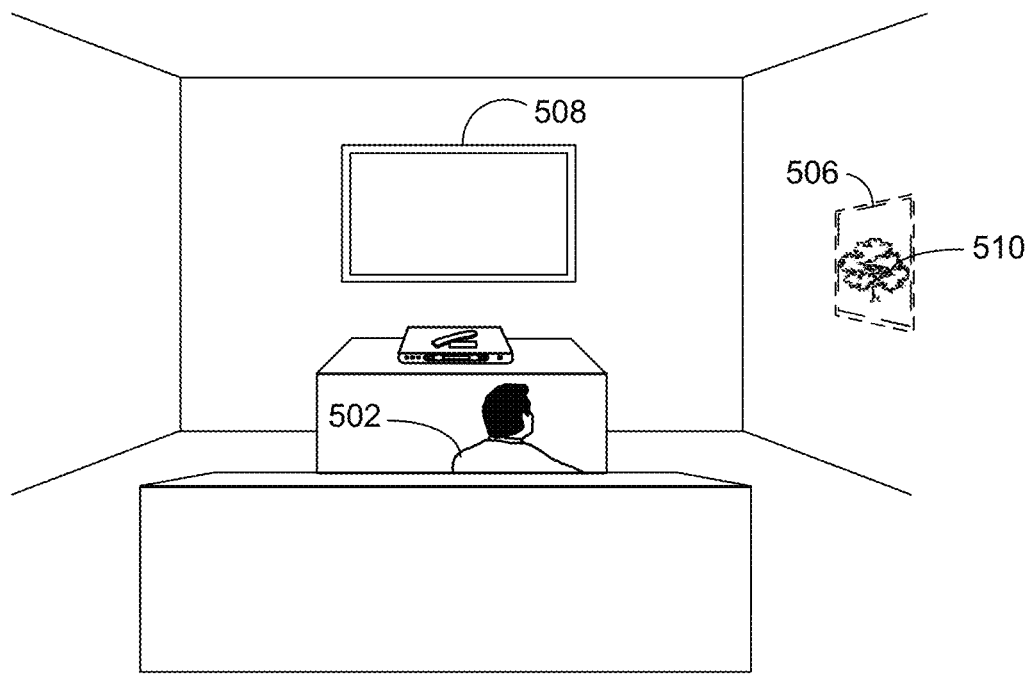
FIG. 5 is an illustrative example of a viewing area featuring a holographic animation moving along a trajectory towards a display device in accordance with some embodiments of the disclosure.
Figure 5:
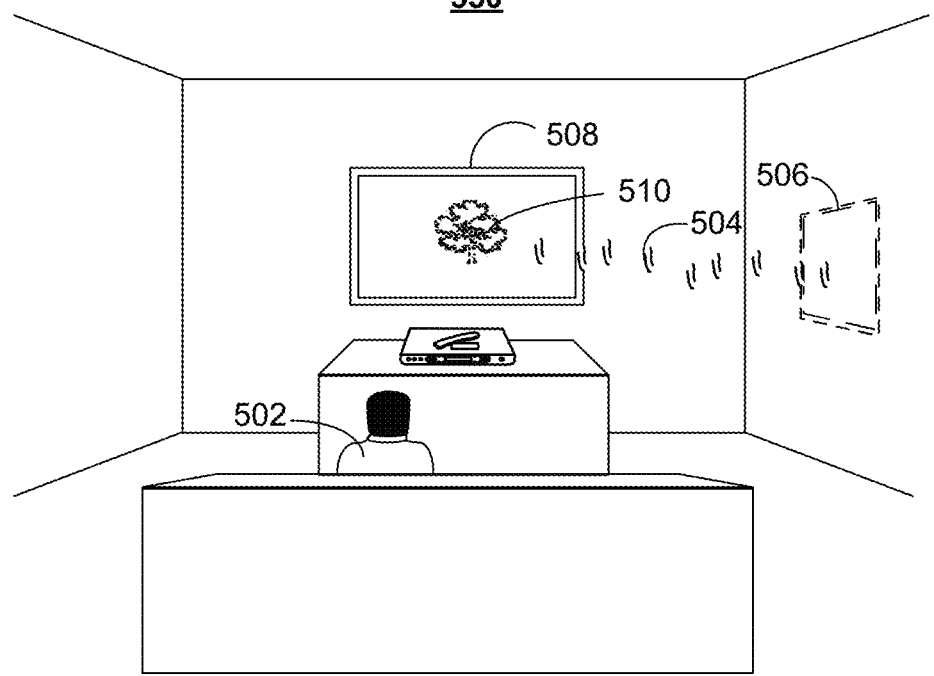

FIG. 5 is an illustrative example of a viewing area featuring a holographic animation moving along a trajectory towards a display device. For example, viewing area 500 includes holographic structure 506. Holographic structure 506 may be generated for display by a holographic interface (e.g., first holographic interface 404 (FIG. 4)) such as a pair of smart glasses worn by user 502.

Holographic structure 506 may also include one or more portions. For example, each portion (e.g., such as portion 510) may correspond to a particular media asset that is available to a user for consumption on display device 508 (e.g., which may corresponds to user equipment 402 (FIG. 4)). Furthermore, in response to detecting a user interaction with holographic structure 506 (e.g., selecting portion 510), the media guidance application may perform a media guidance function such as generating for display a holographic animation associated with portion 510 (or a media asset associated with portion 510).

Viewing area 550 illustrates a situation after a user has selected portion 510 for display on display device 508. For example, in response to detecting (e.g., via detection module 316 (FIG. 3)) that a user (e.g., user 502) executed a hand motion (e.g., a throwing, sliding, flicking, etc., motion) selecting portion 510, the media guidance application may generate for display holographic animation 504. Furthermore, the media guidance application has selected a particular holographic animation (e.g., holographic animation 504) that is associated with the portion 510 (or a media asset associated with portion 510).

For example, portion 510 is associated with a media asset related to trees. Accordingly, the media guidance application has generated for display holographic animation 504, which resembles tree leaves "blowing" from holographic structure 506 to display device 508. In addition to generating for display holographic animation 504, the media guidance has determined a trajectory for holographic animation 504. The trajectory may form a path along which holographic animation moves. Furthermore, the trajectory may be specific to the holographic animation. For example, holographic animation 504 includes a plurality of blowing leaves. Therefore, the trajectory of holographic animation 504 is not a linear route, but instead a non-linear route that resembles a route leaves would take while blowing in the wind.

Figure 6:
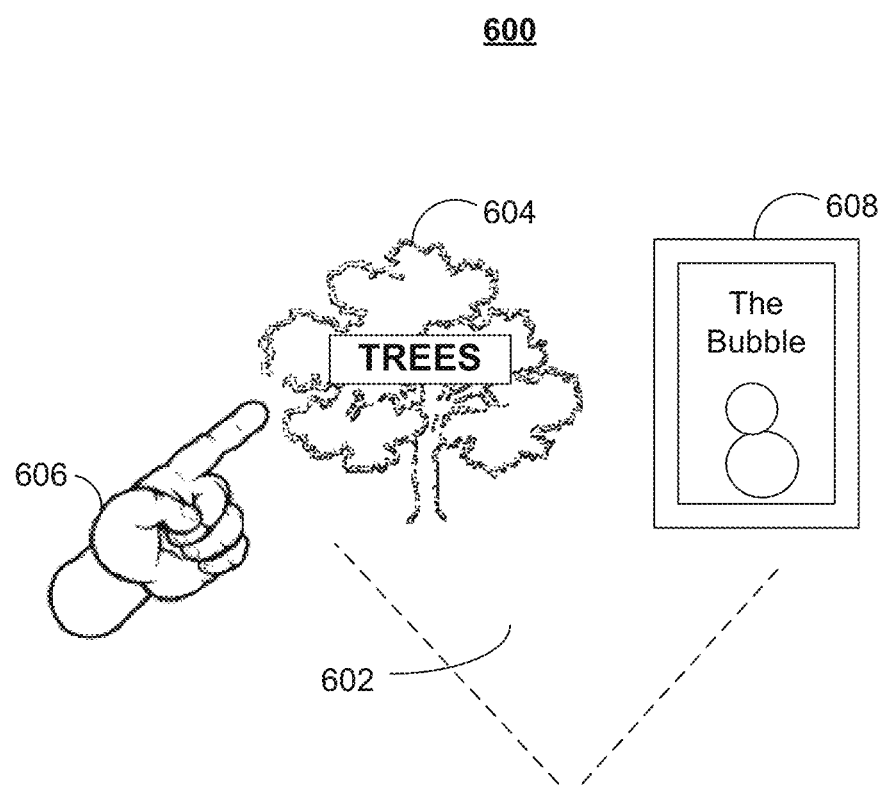
FIG. 6 is an illustrative example of a user interaction selecting a portion of holographic media content in accordance with some embodiments of the disclosure.

FIG. 6 is an illustrative example of a user interaction selecting a portion of holographic media content. In some embodiments, the media guidance application may select the portion of a holographic structure (e.g., holographic structure 506 (FIG. 5)) based on a user input defining geometric bounds of the portion of the holographic structure. For example, the media guidance application may receive a hand motion from a user virtually tracing a portion of the holographic structure as it is presented by a holographic interface (e.g., first holographic interface 404 (FIG. 4)) or as it appears through a user optical device.

In FIG. 6, user 606 is manually selecting portion 604 (as opposed to portion 608) of holographic structure 602. For example, by selecting points about holographic structure 602, user 606 may select one or more portions of holographic media content for performing media guidance functions upon (e.g., such as playing back a related media asset on a display device).

For example, a media guidance application may incorporate and/or have access to a detection module (e.g., detection module 316 (FIG. 3)) that may determine coordinates (e.g., x, y, and z spatial coordinates and/or any other suitable coordinate system) associated with a user interaction. The coordinates may then be used by the media guidance application (e.g., processed by processing circuitry 306 (FIG. 3)) to determine the bounds of the portion of the holographic media content that was selected by the user.

For example, in response to a determining a set of coordinates, the media guidance application may generate a set of connections between the coordinates that form the borders of the holographic media content. In some embodiments, the connections may take the form of straight lines, curves, etc., between the points. Alternatively or additionally, the connections may be adjusted based on the holographic media content near the connection. For example, if two points are selected near a bound of holographic media content (e.g., portion 604) within holographic structure 602, the media guidance application may adjust the curvature of the connection between the points based on holographic media content near the connection. For example, the media guidance application may automatically generate a connection that maintains a constant distance from a bound of the holographic media content.

For example, if a particular portion of holographic media content corresponds to x, y coordinates of (0, 4), (4, 0), (4, 8) and a user selects points corresponding to (0, 4) and (4, 8), the media guidance application may automatically select (e.g., via processing circuitry 306 (FIG. 3)), point (4, 0) as a bound to the portion of the holographic media content selected by the user.

After the media guidance application may determine one or more portions of a media guidance application have been selected, the media guidance application may receive (e.g., via a user interaction from user 606) a media guidance function to perform on the selected portion. For example, the media guidance application may receive a pinch-and-expand motion causing the media guidance application to generate for display a zoomed-in version of the holographic media content. In another example, the media guidance application may receive an input via user input interface (e.g., user input interface 310 (FIG. 3)) that causes the media guidance application to generate a holographic animation that moves towards a display device. For example, the media guidance application may execute commands (e.g., related to media guidance functions) in response to user interactions detected (e.g., via detection module 316 (FIG. 3)) near one or more portions of a holographic structure or may execute commands in response to user inputs received via a user device that are not holographic interfaces.

In some embodiments, the media guidance application may detect a trajectory associated with a user interaction (e.g., performed by user 606) by monitoring the path and velocity associated with the user interaction (e.g., the movement of a hand of a user while the hand is within a predetermined proximity to holographic structure 602). Based on the trajectory and the user interaction, the media guidance application may select components of a holographic animation associated with the selection or other media guidance functions. For example, the media guidance application may cross-reference the detected user interaction (e.g., detected via detection module 316 (FIG. 3)) with a database listing media guidance functions associated with different user interactions. For example, in response to a pinching motion, the media guidance application may determine to zoom a portion of holographic structure 602. In contrast, in response to a throwing, sliding, pushing, flicking, etc., motion, the media guidance application may determine to generate for display a holographic animation. Furthermore, the components (e.g., velocity, direction, etc.) of the user interaction may influence the holographic animation.

For example, the media guidance application may determine which of the one or more display devices to use to present a media asset associated with the selected portion based on the direction and/or speed of the user interaction. For example, if a trajectory of a user interaction is associated with a direction and/or angle, the media guidance application may select one or more display devices in response to determining that the one or more display devices are also associated with the same direction and/or angle. For example, if the media guidance application determines that the user interaction (e.g., as it passes near holographic structure 602) moved from left to right, the media guidance application may select a display device to the right of holographic structure 602. In contrast, if the media guidance application determines that the user interaction (e.g., as it passes near holographic structure 602) moved from right to left, the media guidance application may select a display device to the left of holographic structure 602.

Additionally or alternatively, if the media guidance application determines that the user interaction (e.g., as it passes near holographic structure 602) had a high velocity (e.g., associated with a forceful user interaction), the media guidance application may select a display device a farther distance away relative to holographic structure 602. In contrast, if the media guidance application determines that the user interaction (e.g., as it passes near holographic structure 602) had a low velocity (e.g., associated with a weak user interaction), the media guidance application may select a display device only a short distance away relative to holographic structure 602.

Upon detecting that a user interaction is affecting holographic structure 602, the media guidance application may also modify the presentation of holographic structure 602. For example, in response to a user interaction associated with pursuing a series of holographic file folders (e.g., when holographic structure 602 resembles a filing cabinet), the media guidance application may cause holographic structure 602 to move accordingly. Additionally or alternatively, in response to a user interaction associated with a pushing motion (e.g., pushing a drawer of a filing cabinet closed), the media guidance application may laterally translate one or more portions of holographic structure 602. Based on the translation, holographic structure 602 may feature different portions (e.g., each of which may correspond to different media assets).

In some embodiments, the trajectory of a user interaction may also affect the trajectory of a holographic animation (e.g., holographic animation 504 (FIG. 5)). For example, when the media guidance application determines (e.g., via processing circuitry 306 (FIG. 3)) a trajectory associated with a user interaction, the media guidance application may determine one or more components of the trajectory. For example, the media guidance application may determine a direction, distance, speed, etc., associated with the user interaction. The media guidance application may then search for a holographic animation (or modify a holographic animation) based on the determined components).

For example, the media guidance application may determine a speed associated with a user interaction selecting portion 604. The media guidance application may then cross-reference the speed with a database associated with holographic animations associated with portion 604 to determine a holographic animation that corresponds to portion 604 at the determined speed. Alternatively or additionally, the media guidance application may modify the speed of a holographic animation associated with portion 604 to match the speed of the user interaction.

In some embodiments, the media guidance application may select a portion of holographic structure in response to determining a user is focusing on a portion of the holographic structure 602. For example, the media guidance application may monitor a location where the eyes of a user are focusing and automatically select the portion of the holographic media content associated with that location. For example, as discussed below in relation to FIG. 7, the media guidance application may include an eye contact detection component, which determines or receives a location upon which one or both of a user's eyes are focused.

Additionally or alternatively, the media guidance application may associate the coordinates within a holographic structure (e.g., holographic structure 602) to a particular media asset. These coordinates may be represented to the user as a particular portion (e.g., portion 604). Thus, the particular portion may be designed to appear to the user as content or subject matter associated with the media asset. For example, the portion 604 is associated with a media asset entitled "Trees." Thus, the portion 604 resembles a tree. Likewise, portion 608 is associated with a media asset entitled "The Bubble." In this case, portion 608 may resemble box art or a movie poster that is associated with the media asset and that displays the title of the media asset.

Figure 7:
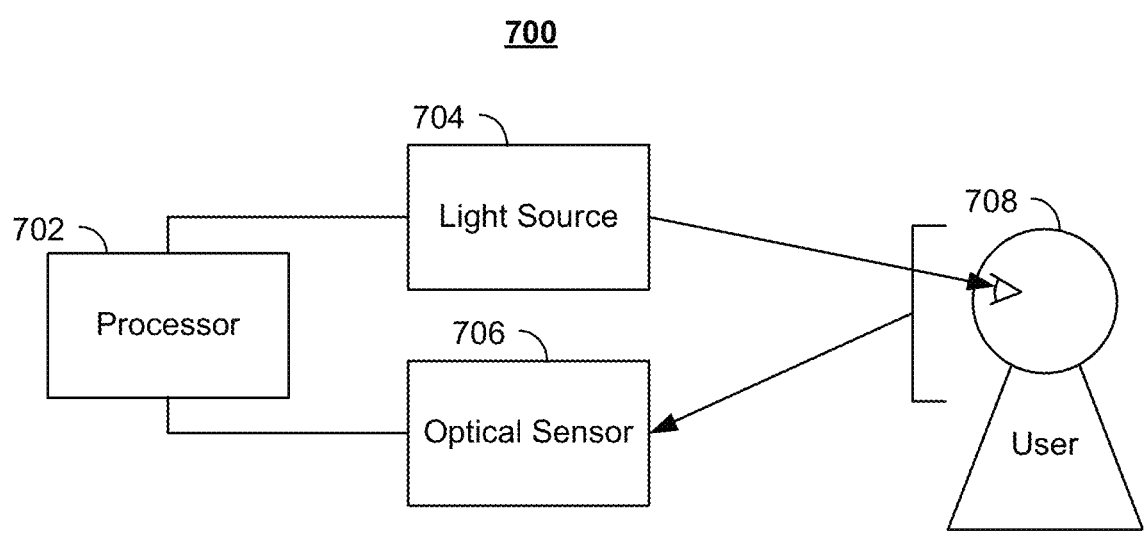
FIG. 7 is an illustrative example of a component used to determine a location at which a user is focusing in accordance with some embodiments of the disclosure.

FIG. 7 is an illustrative example of one component of a detection module (e.g., detection module 316 (FIG. 3)), which may be accessed by a media guidance application in accordance with some embodiments of the disclosure. FIG. 7 shows eye contact detection component 700, which may be used to identify the gaze point of a user of user equipment 300 (FIG. 3)), in order to determine whether or not a user is focusing on a particular portion of a holographic structure. For example, the location upon which a user's eyes are focused may determine whether or not the media guidance application selects one portion (e.g., portion 604 (FIG. 6)) of a holographic structure (e.g., holographic structure 602 (FIG. 6)) over another. For example, eye contact detection component 700 may determine whether one or both eyes of the user are focused on a position relative to a holographic structure.

Eye contact detection component 700 includes processor 702, light source 704, and optical sensor 706. Light source 704 transmits light that reaches at least one eye of a user, and optical sensor 706 is directed at the user to sense reflected light. Optical sensor 706 transmits collected data to processor 702, and based on the data received from optical sensor 706, processor 702 determines a user's gaze point.

In some embodiments, eye contact detection component 700 is configured for determining a gaze point of a single user. In other embodiments, eye contact detection component 700 may determine gaze points for a plurality of users. Eye contact detection component 700 may also identify multiple users of user devices (e.g., user equipment device 300 (FIG. 3)). For example, eye contact detection component 700 may determine the one or more portions upon which a plurality of users about a holographic structure (e.g., holographic structure 602 (FIG. 6)) are focusing.

Processor 702 may be integrated with one or more light sources 704 and one or more optical sensors 706 in a single device. Additionally or alternatively, one or more light sources 704 and one or more optical sensors 706 may be housed separately from processor 702 and in wireless or wired communication with processor 702. One or more of processors 702, light sources 704, and optical sensors 706 may be integrated into a user device (e.g., user equipment device 300 (FIG. 3), holographic structure 602 (FIG. 6A), etc.).

Processor 702 may be similar to processing circuitry 306 (FIG. 3) described above. In some embodiments, processor 702 may be processing circuitry 306 (FIG. 3), with processing circuitry 306 in communication with light source 704 and optical sensor 706. In other embodiments, processor 702 may be separate from but optionally in communication with processing circuitry 306.

Light source 704 transmits light to one or both eyes of one or more users. Light source 704 may emit, for example, infrared (IR) light, near infrared light, or visible light. The light emitted by light source 704 may be collimated or non-collimated. The light is reflected in a user's eye, forming, for example, the reflection from the outer surface of the cornea (i.e., a first Purkinje image), the reflection from the inner surface of the cornea (i.e., a second Purkinje image), the reflection from the outer (anterior) surface of the lens (i.e., a third Purkinje image), and/or the reflection from the inner (posterior) surface of the lens (i.e., a fourth Purkinje image).

Optical sensor 706 collects visual information, such as an image or series of images, of one or both of one or more users' eyes. Optical sensor 706 transmits the collected image(s) to processor 702, which processes the received image(s) to identify a glint (i.e., corneal reflection) and/or other reflection in one or both eyes of one or more users. Processor 702 may also determine the location of the center of the pupil of one or both eyes of one or more users. For each eye, processor 702 may compare the location of the pupil to the location of the glint and/or other reflection to estimate the gaze point. Processor 702 may also store or obtain information describing the location of one or more light sources 704 and/or the location of one or more optical sensors 706 relative to a holographic structure (e.g., holographic structure 602 (FIG. 6)). Using this information, processor 702 may determine a user's gaze point on a portion of a holographic structure (e.g., holographic structure 602 (FIG. 6)), or processor 702 may determine whether or not a user's gaze point is at a particular portion of a holographic structure (e.g., holographic structure 602 (FIG. 6)).

In some embodiments, eye contact detection component 700 performs best if the position of a user's head is fixed or relatively stable. In other embodiments, eye contact detection component 700 is configured to account for a user's head movement, which allows the user a more natural viewing experience than if the user's head were fixed in a particular position.

In some embodiments accounting for a user's head movement, eye contact detection component 700 includes two or more optical sensors 706. For example, two cameras may be arranged to form a stereo vision system for obtaining a 3D position of the user's eye or eyes; this allows processor 702 to compensate for head movement when determining the user's gaze point. The two or more optical sensors 706 may be part of a single unit or may be separate units. For example, a user device (e.g., user equipment device 300 (FIG. 3)) may include two cameras used as optical sensors 706, or eye contact detection component 700 in communication with the user device (e.g., user equipment device 300 (FIG. 3)) may include two optical sensors 706. In other embodiments, each of the user device (e.g., user equipment device 300 (FIG. 3)) and eye contact detection component 700 may include an optical sensor, and processor 702 receives image data from the optical sensor of the user device and the optical sensor of eye contact detection component 700. Processor 702 may receive data identifying the location of optical sensor 706 relative to a holographic structure (e.g., holographic structure 602 (FIG. 6)) and/or relative to other optical sensors and use this information when determining the gaze point.

In other embodiments accounting for a user's head movement, eye contact detection component 700 includes two or more light sources for generating multiple glints. For example, two light sources 704 may create glints at different locations of an eye; having information on the two glints allows the processor to determine a 3D position of the user's eye or eyes, allowing processor 702 to compensate for head movement. Processor 702 may also receive data identifying the location of light sources 704 relative to a holographic structure (e.g., holographic structure 602 (FIG. 6)) and/or relative to other optical sensors and use this information when determining the gaze point.

In some embodiments, other types of eye contact detection components that do not utilize a light source may be used. For example, optical sensor 706 and processor 702 may track other features of a user's eye, such as the retinal blood vessels or other features inside or on the surface of the user's eye, and follow these features as the eye rotates. Any other equipment or method for determining one or more users' gaze point(s) not discussed above may be used in addition to or instead of the above-described embodiments of eye contact detection component 700.

It should be noted that eye contact detection component 700 is but one type of component that may be incorporated into or accessible by detection module 316 (FIG. 3) or the media guidance application. Other types of components, which may generate other types of data (e.g., video, audio, textual, etc.) are fully within the bounds of this disclosure.

Figure 8:
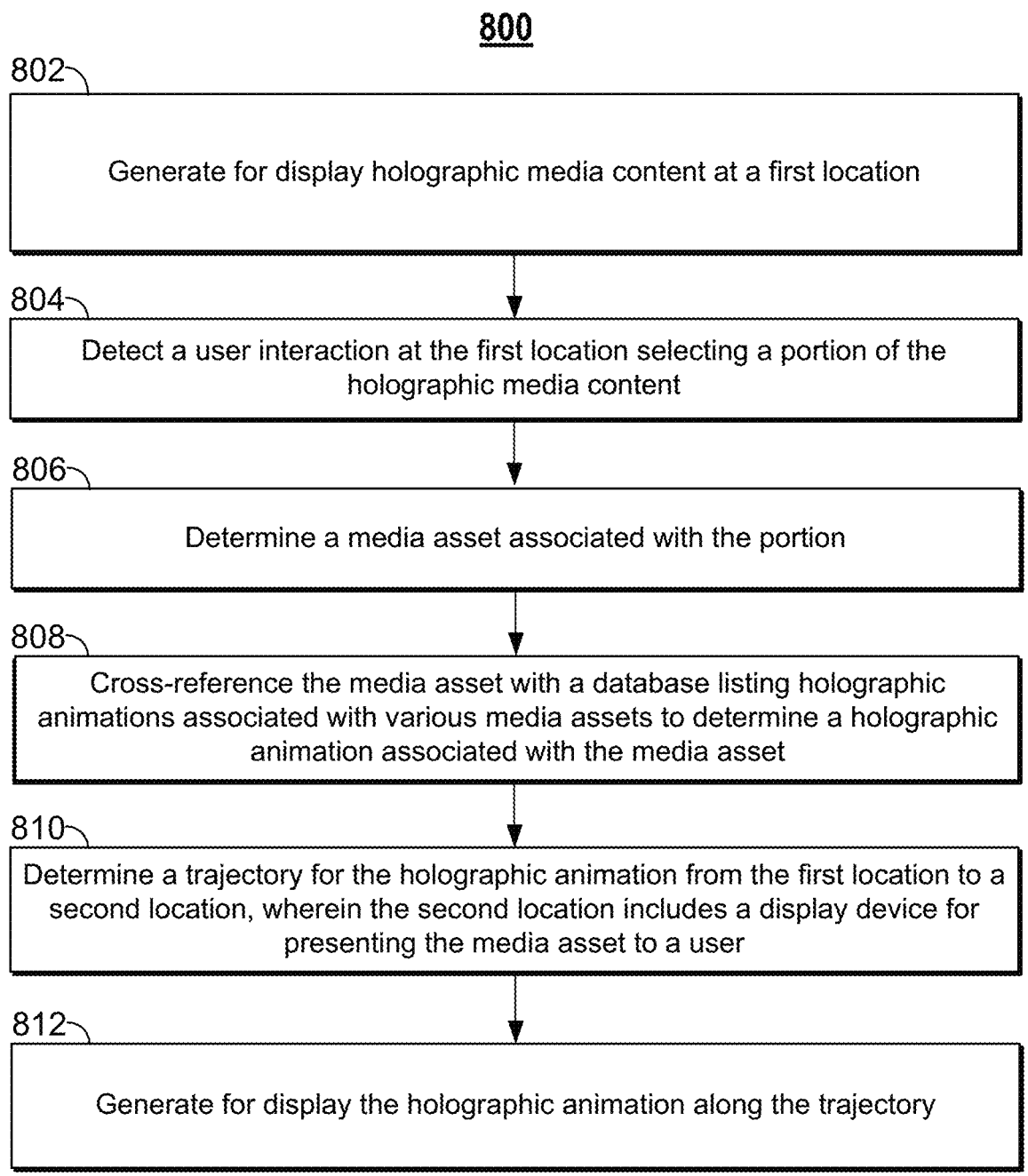
FIG. 8 is a flowchart of illustrative steps for generating for display a holographic animation in accordance with some embodiments of the disclosure.

FIG. 8 is a flowchart of illustrative steps for instructing a second holographic interface to generate for display a portion of the holographic media content. It should be noted that process 800 or any step thereof could be performed on, or provided by, any of the devices shown in FIGS. 3-4. For example, process 800 may be executed by control circuitry 304 (FIG. 3) as instructed by a media guidance application implemented on user equipment 402, first holographic interface 404, and/or second holographic interface 406 (FIG. 4) in order to present holographic animations (e.g., holographic animation 504 (FIG. 5)). In addition, one or more steps of process 800 may be incorporated into or combined with one or more steps of any other process or embodiment (e.g., process 900 (FIG. 9)).

At step 802, the media guidance application generates for display holographic media content at a first location. For example, as described above, the media guidance application may receive a user input via an interface (e.g., user input interface 310 (FIG. 3)) associated with the first holographic interface (e.g., first holographic interface 404 (FIG. 4)). In some embodiments, the user input may be received via a display screen (e.g., display 200 (FIG. 2)) or via a user interaction (e.g., as described in relation to FIGS. 5-6)) about a holographic structure (e.g., holographic structure 602. For example, the first holographic media interface may include first holographic interface circuitry (e.g., incorporated into and/or coupled to control circuitry 304 (FIG. 3)) configured to generate for display holographic media content at a first location. The media guidance application may instruct (e.g., via control circuitry 304 (FIG. 3)) the first holographic media interface to generate for display holographic media content by issuing instructions to the first holographic interface circuitry.

At step 804, the media guidance application detects a user interaction at the first location selecting a portion of the holographic media content. For example, the media guidance application may detect (e.g., via detection module 316 (FIG. 3)) a user interaction (e.g., a throwing motion, a flicking motion, and/or other user motion mimicking contact with holographic media content) that indicates a user selection. For example, the media guidance application may receive information indicating (e.g., at control circuitry 304 (FIG. 3) from detection module circuitry) that a user interaction was detected at the first location selecting a portion (e.g., portion 604 (FIG. 6)) of the holographic media content.

At step 806, the media guidance application determines (e.g., via control circuitry 304 (FIG. 3)) a media asset associated with the selected portion. For example, the media guidance application may cross-reference the selected portion in a database (e.g., located at storage 308 (FIG. 3) and/or any location accessible via communications network 414 (FIG. 4)) listing media assets associated with various portions of the holographic media content to determine one or more media assets associated with the selected portion.

At step 808, the media guidance application cross-references (e.g., via control circuitry 304 (FIG. 3)) the media asset with a database (e.g., located at storage 308 (FIG. 3) and/or any location accessible via communications network 414 (FIG. 4)) listing holographic animations associated with various media assets to determine a holographic animation associated with the media asset. For example, each media asset may correspond to a unique animation, in which the unique animation is based on the content of the media asset. Alternatively or additionally, in response to a selection (e.g., received via user input interface 310 (FIG. 3) and/or the detection of a user interaction via detection module 316 (FIG. 3)) of a portion associated with a particular media asset, the media guidance application may reference (e.g., via control circuitry 304 (FIG. 3)) a look-up table database (e.g., located at storage 308 (FIG. 3) and/or any location accessible via communications network 414 (FIG. 4)) listing characters within that media asset. The media guidance application may then generate for display an animation featuring the character.

At step 810, the media guidance application determines (e.g., via control circuitry 304 (FIG. 3)) a trajectory for the holographic animation (e.g., holographic animation 504 (FIG. 5)) from the first location (e.g., holographic structure 506 FIG. 5)) to a second location, in which the second location includes a display device for presenting the media asset to a user. For example, after selecting a holographic animation, the media guidance application may determine a path along which the animation should travel. In some embodiments, the determination may include computing various components associated with the trajectory as well as any variations in the routes to a selected display device. For example, the media guidance application may receive one or more components regarding the user interaction and or the distance, direction, etc. to a selected display device. The media guidance application may then plot (e.g., via control circuitry 304 (FIG. 3)) a course from the first location to the second location.

At step 812, the media guidance application generates for display a holographic animation along the trajectory. For example, upon plotting a course for a holographic animation to travel and, after determining a particular holographic animation to generate for display, the media guidance application (e.g., via control circuitry 304 (FIG. 3)) generates for display a holographic animation along the trajectory. For example, the media guidance application may use the same holographic interface used to generate the holographic media content to present the holographic animation. Alternatively or additionally, the media guidance application may user other devices (e.g., other holographic interfaces and/or optical user devices) to present the holographic animation.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-6B could be used to perform one of more of the steps in FIG. 8.

Figure 9:
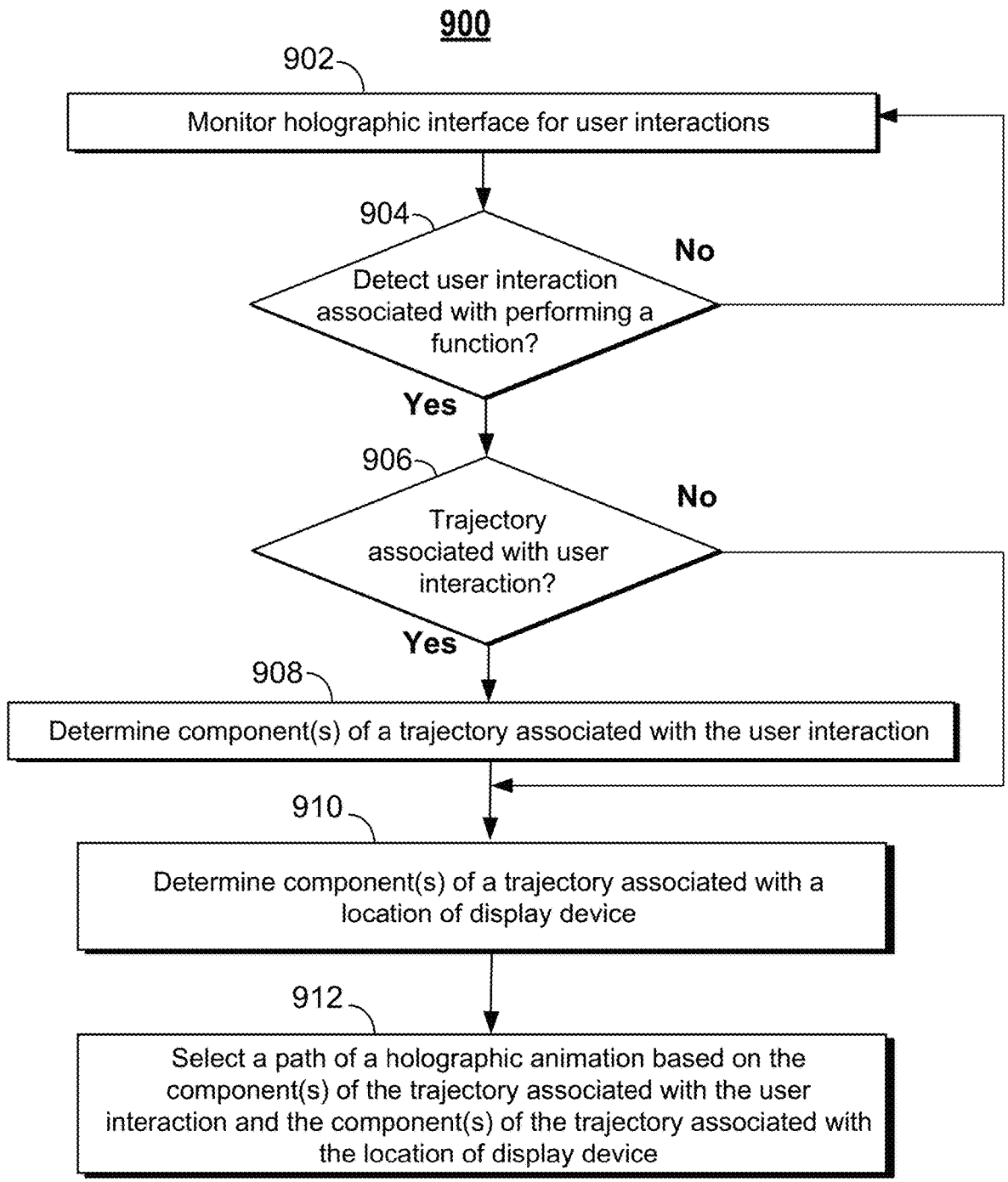
FIG. 9 is a flowchart of illustrative steps for selecting a path of a holographic animation based on components of a trajectory associated with the user interaction and components of a trajectory associated with the location of a display device in accordance with some embodiments of the disclosure.

FIG. 9 is a flowchart of illustrative steps for selecting a path of a holographic animation based on components of a trajectory associated with the user interaction and components of a trajectory associated with the location of a display device. It should be noted that process 900 or any step thereof could be performed on, or provided by, any of the devices shown in FIGS. 3-4. For example, process 900 may be executed by control circuitry 304 (FIG. 3) as instructed by a media guidance application implemented on user equipment 402, first holographic interface 404, and/or second holographic interface 406 (FIG. 4) in order to present holographic media content (e.g., holographic structure 506 and/or holographic animation 504 (FIG. 5)). In addition, one or more steps of process 900 may be incorporated into or combined with one or more steps of any other process or embodiment (e.g., process 800 (FIG. 8)).

At step 902, the media guidance application monitors a holographic interface for user interactions. For example, the media guidance application implemented on a holographic interface (e.g., first holographic interface 404 (FIG. 4)) may monitor for one or more user interactions via a detection module (e.g., detection module 316 (FIG. 3)). For example, a detection module incorporated into a user device (e.g., user equipment device 300 (FIG. 3)) and/or accessible by a media guidance application may monitor for all user interactions within a particular proximity to a holographic interface. In some embodiments, the media guidance application may monitor only user interactions within an area associated with a holographic interface.

At step 904, the media guidance application determines whether or not a user interaction associated with performing a media guidance function is detected. For example, the media guidance application may determine (e.g., via processing circuitry 306 (FIG. 3)) whether or not an object (e.g., a hand of a user) virtually touched holographic media content (e.g., holographic structure 506 (FIG. 5)). In some embodiments, determining whether or not a user "touched" the holographic media content may include determining whether or not the position of an object (e.g., the hand) overlapped the coordinates associated with the holographic media content.

For example, the media guidance application may determine (e.g., via detection module 316 (FIG. 3)) the bounds or spatial coordinates associated with a user (or part of a user). The media guidance application may also determine (e.g., via detection module 316 (FIG. 3) and/or processing circuitry 306 (FIG. 3)) the bounds or spatial coordinates associated with holographic media content (e.g., holographic structure 506 (FIG. 5)). The media guidance application may then determine (e.g., via processing circuitry 306 (FIG. 3)) whether or not spatial coordinates associated with the user and the holographic media content overlap (e.g., indicating that the user is "touching" the holographic media content). If the media guidance application does not detect a user interaction, the media guidance application returns to step 902. Alternatively, in response to determining that the spatial coordinates overlap (e.g., corresponding to a user action associated with performing a function), the media guidance application may proceed to step 906.

At step 906, the media guidance application determines whether or not a trajectory is associated with the user interaction. For example, the media guidance application may classify different user interactions and determine particular media guidance functions to perform based on the classification. In such cases, not all user interactions may be associated with a trajectory. For example, a user interaction selecting a media listing (e.g., program listing 108 (FIG. 1)) or a selectable option (e.g., selectable option 204 (FIG. 2)) from a holographic display may not be associated with a trajectory. Instead, the movement (e.g., approaching, but not passing through a position associated with holographic media content) of the user interaction (e.g., as determined by detection module 316 (FIG. 3)) and/or the type of hand motion (e.g., replicating the pressing of a touchscreen icon) by a user (e.g., user 502 (FIG. 5)) may cause the media guidance application to perform a particular media function (e.g., present a media asset or menu associated with the media listing and selectable option, respectively) irrespective of the trajectory associated with the user interaction.

Alternatively, the classification of the user interaction may cause the media guidance application to determine one or more components of the trajectory of the user interaction. For example, if the movement (e.g., approaching and passing through a position associated with holographic media content) of the user interaction relative to the holographic media content (e.g., as determined by detection module 316 (FIG. 3)) and/or the type of hand motion (e.g., replicating the pushing of an object) by a user (e.g., user 606 (FIG. 6B)) may cause the media guidance application to determine one or more components associated with the trajectory.

If the media guidance application determines that the user interaction is not associated with a trajectory, the media guidance application proceeds to step 910. If the media guidance application determines that the user interaction is associated with a trajectory, the media guidance application proceeds to step 908. At step 908, the media guidance application determines one or more components associated with the trajectory. For example, the media guidance application may determine (e.g., via detection module 316 (FIG. 3)) a direction and velocity associated with a user interaction.

For example, the media guidance application (e.g., via detection module 316 (FIG. 3)) may record data (e.g., associated with various components) at various times and locations during a user interaction. For example, when the hand of a user enters a particular proximity to the holographic media content, the media guidance application may begin tracking one or more components (e.g., velocity, direction, etc.) associated with the hand. By taking various measurements during the user interaction, the media guidance application may develop a data set describing the path the hand of the user followed during the user interaction as a function of time. Based on this path, the media guidance application may (e.g., via processing circuitry 306 (FIG. 3)) interpolate and plot a projected trajectory for the user interaction.

At step 910, the media guidance application determines one or more components of a trajectory associated with a location of display device. For example, after interpolating and plotting a projected trajectory for the user interaction to determine the particular coordinates with which a user would like holographic media content shared, the media guidance application may cross-reference the coordinates with a database (e.g., located locally at storage 308 (FIG. 3)) or remotely at any location accessible via communications network 414 (FIG. 4)) to determine one or more display devices (e.g., display device 508 (FIG. 5)) at those coordinates. For example, the media guidance application may receive signals (e.g., via I/O path 302 (FIG. 3)) from the display devices indicating their location, associated user, display properties, parental control, etc. The media guidance application may compare the information received from other display devices to the coordinates of the holographic media content to determine one or more components for the trajectory associated with the location of the display device.

At step 914, the media guidance application selects a path of a holographic animation based on the one or more components of the trajectory associated with the user interaction and the one or more components of the trajectory associated with the location of the display device. For example, in response to a user interaction with a particular velocity and direction, the media guidance application may select (e.g., via processing circuitry 306 (FIG. 3)) a display device with corresponding coordinates with which to share the holographic media content. For example, when selecting between display devices (one further away than the other) a user interaction with a low velocity may cause the media guidance application to select the closer display device. The media guidance application may then determine the coordinates of the closer display device. Based on the coordinates, the media guidance application may determine (e.g., via processing circuitry 306 (FIG. 3)) the trajectory needed to reach that display device.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one of more of the steps in FIG. 8.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different order, or done in parallel. In addition, the systems and methods described herein may be performed in real-time. It should also be noted, the systems and/or methods described above may be applied to, or used in accordance with, other systems and/or methods.

What is claimed is:

1. A method for generating for display, in a physical space, a virtual animation within a virtual environment, wherein a plurality of media devices is located in the physical space, the method comprising:
    determining a media asset associated with a portion of virtual content generated for display at a first location in the physical space;
    cross-referencing the media asset with a database of virtual animations associated with various media assets to determine a virtual animation associated with the media asset;
    identifying a second location associated with the media asset within the physical space, wherein a first media device of the plurality of media devices that supports a format of the media asset is located at the second location;
    determining a trajectory from the first location to the second location; and
    generating for display the virtual animation along the trajectory, wherein the virtual animation moves along the trajectory independently from the virtual content.

2. The method of claim 1, wherein the second location includes a display device for presenting the media asset, the method further comprising selecting the second location from a plurality of locations based on a format of the display device corresponding to a format of the media asset.

3. The method of claim 1, further comprising detecting a user interaction selecting a portion of the virtual content.

4. The method of claim 3, wherein the user interaction comprises a user focusing on the portion of the virtual content.

5. The method of claim 3, further comprising:
    determining a speed associated with the user interaction;
    cross-referencing the speed with a database associated with projected distances corresponding to different speeds of user interactions to determine a projected distance associated with the speed; and
    selecting the second location in response to determining an actual distance between the first location and the second location corresponds to the projected distance associated with the speed.

6. The method of claim 3, wherein the trajectory is based on a direction associated with the user interaction.

7. The method of claim 3, wherein a speed of the virtual animation along the trajectory is based on a speed of the user interaction.

8. The method of claim 1, further comprising:
    determining a direction associated with the trajectory; and
    determining a distance associated with the trajectory.

9. The method of claim 1, wherein the virtual content comprises a plurality of portions, and wherein each portion of the plurality of portions is associated with a different media asset.

10. The method of claim 1, wherein the virtual content comprises a virtual structure that is manipulated by a user to select the media asset.

11. A system for generating for display, in a physical space, a virtual animation within a virtual environment, wherein a plurality of media devices is located in the physical space, the system comprising:
    storage circuitry configured to store a database of virtual animations associated with various media assets; and
    control circuitry configured to:
        determine a media asset associated with a portion of virtual content generated for display at a first location in the physical space;
        cross-reference the media asset with the database of virtual animations associated with various media assets to determine a virtual animation associated with the media asset;
        identify a second location associated with the media asset within the physical space, wherein a first media device of the plurality of media devices that supports a format of the media asset is located at the second location;
        determine a trajectory from the first location to the second location; and
        generate for display the virtual animation along the trajectory, wherein the virtual animation moves along the trajectory independently from the virtual content.

12. The system of claim 11, wherein the second location includes a display device for presenting the media asset, and wherein the control circuitry is further configured to select the second location from a plurality of locations based on a format of the display device corresponding to a format of the media asset.

13. The system of claim 11, wherein the control circuitry is further configured to detect a user interaction selecting a portion of the virtual content.

14. The system of claim 13, wherein the user interaction comprises a user focusing on the portion of the virtual content.

15. The system of claim 13, wherein the control circuitry is further configured to:
    determine a speed associated with the user interaction;
    cross-reference the speed with a database associated with projected distances corresponding to different speeds of user interactions to determine a projected distance associated with the speed; and
    select the second location in response to determining an actual distance between the first location and the second location corresponds to the projected distance associated with the speed.

16. The system of claim 13, wherein the trajectory is based on a direction associated with the user interaction.

17. The system of claim 13, wherein a speed of the virtual animation along the trajectory is based on a speed of the user interaction.

18. The system of claim 11, wherein the control circuitry is further configured to:
    determine a direction associated with the trajectory; and
    determine a distance associated with the trajectory.

19. The system of claim 11, wherein the virtual content comprises a plurality of portions, and wherein each portion of the plurality of portions is associated with a different media asset.

20. The system of claim 11, wherein the virtual content comprises a virtual structure that is manipulated by a user to select the media asset.

\* \* \* \* \*